United States Patent [19]

Eccles et al.

[11] Patent Number: 4,693,795

[45] Date of Patent: Sep. 15, 1987

[54] PRODUCTION OF URANIUM TETRAFLUORIDE

[75] Inventors: Harry Eccles; Stephen A. Fell, both of Preston, England

[73] Assignee: British Nuclear Fuels Plc, Warrington, England

[21] Appl. No.: 746,656

[22] Filed: Jun. 20, 1985

[30] Foreign Application Priority Data

Jul. 6, 1984 [GB] United Kingdom ............... 8417364

[51] Int. Cl.$^4$ .............................................. C25B 1/24
[52] U.S. Cl. ...................................... 204/94; 204/1.5; 423/259
[58] Field of Search .................... 204/94, 1.5; 423/259

[56] References Cited

U.S. PATENT DOCUMENTS

| | | | |
|---|---|---|---|
| 2,687,995 | 8/1954 | Lofthouse | 204/94 |
| 2,733,200 | 1/1956 | Kunin | 204/94 |
| 2,775,552 | 12/1956 | Boyer | 204/94 |
| 2,859,156 | 11/1958 | Allen et al. | 204/1.5 |
| 3,065,045 | 11/1962 | Ito et al. | 204/1.5 |
| 3,347,761 | 10/1967 | Blcek | 204/94 |

Primary Examiner—T. Tung
Attorney, Agent, or Firm—Larson and Taylor

[57] ABSTRACT

In a process for the production of uranium tetrafluoride ($UF_4$), uranic oxides, $UO_3$ and $U_3O_8$, are dissolved in dilute sulphuric acid ($H_2SO_4$) and hydrofluoric acid (HF) is added to produce a uranyl fluoride-sulphate solution which is electrolytically reduced to uranous fluoride-sulphate complexes from which hydrated uranium tetrafluoride is precipitated by the addition of dilute HF at elevated temperature (preferably above 90° C.). The uranyl fluoride-sulphate solution can alternatively be produced by dissolving uranyl fluoride in $H_2SO_4$ or from uranyl sulphate solutions (derived from solvent extraction or ion exchange purification processes) conditioned with HF.

10 Claims, No Drawings

PRODUCTION OF URANIUM TETRAFLUORIDE

BACKGROUND OF THE INVENTION

This invention relates to the production of uranium tetrafluoride.

The production of uranium tetrafluoride is often a necessary step in a nuclear fuel cycle, for example as an intermediate in the treatment of uraniferous minerals or in the enrichment of nuclear fuel materials in fissionable isotopes. In such production there is usually required the reduction of uranyl or uranic ions to uranous ions and electrolytic reduction of various solutions has been proposed to bring this about.

FEATURES AND ASPECTS OF THE INVENTION

The present invention is concerned with a process for the production of uranium tetrafluoride which includes the step of electrolytic reduction of a solution of uranyl fluoride-sulphate in aqueous sulphuric acid to uranous fluoride-sulphate complexes, and the subsequent step of precipitation of hydrated uranium tetrafluoride from the uranous solution at an elevated temperature by the addition of dilute hydrofluoric acid.

The uranyl fluoride-sulphate may be prepared by dissolving uranic oxides in dilute sulphuric acid and adding hydrofluoric acid. The uranic oxides are those generally identified by the formulae $UO_3$ and $U_3O_8$. With $U_3O_8$ it is usually necessary for an oxidant to be present. Hydrogen peroxide is considered most suitable. The hydrofluoric acid is conveniently added as an aqueous solution. It is likely to be practicable to recycle spent catholyte acid to dissolve the uranium feed material thus reducing the effluent to be discarded.

The uranyl fluoride-sulphate may also be prepared by dissolving uranyl fluoride ($UO_2F_2$) in suphuric acid and it may not then be necessary to add hydrofluoric acid. Further a uranyl fluoride sulphate solution may be prepared from uranyl sulphate solutions which have been produced in solvent extraction or ion exchange purification processes, by conditioning with hydrofluoric acid.

DESCRIPTION OF THE PREFERRED EMBODIMENT

An advantage of uranous fluorosulphate is its phase stability but for the uranium ions to remain in solution throughout the electrolytic reduction the ratio of sulphate ions to uranium ions should be greater than 1 to 1 but preferably not greater than 2.5 to 1, whereas the ratio of fluoride ions to uranium ions should be less than 2 to 1 but preferably not less than 0.50 to 1. The presence of the fluoride however does allow the concentration of uranium in the solution to be increased above that possible with sulphate alone. This is shown by the results given in Table I below for equilibrium solubilities (60 hour equilibration) of U(IV) in $HF/H_2SO_4$ mixtures as uranium (IV).

TABLE 1

| Temperature °C. | $F^-$:U Molar ratio | $SO_4^{2-}$:U Molar ratio | U(IV) solubility g/l |
|---|---|---|---|
| 50 | 0* | 2.5 | 110 |
| 50 | 1 | 2.5 | 210 |
| 20 | 1 | 2 | 260 |
| 50 | 1 | 2 | 290 |

*no fluoride present

Since in accordance with the invention uranous fluorosulphate is to remain in solution throughout the electrolysis there is little or no precipitate to interfere, and a conventional electrolytic cell of the plate and frame type with an ion exchange membrane may be employed. In a first example a circular membrane electrolytic cell was used. The lead anode and cathode each of 40 cm$^2$ surface area were separated by a NAFION 117 membrane with an anode-cathode gap of 2 cm. Both the anolyte and catholyte were recirculated to each cell compartment at a rate of 800 mls/minute. Electrolysis was carried out at both ambient and a constant temperature of 50° C. with a 4A current loading. The catholyte had a composition of approximately 200 g/l uranium and acid concentrations of 0.5M free sulphuric acid and 0.75M hydrofluoric acid; the anolyte was 1.0M sulphuric acid. The results are given in Table II.

TABLE II

| Temperature °C. | Applied Potential volts | Electrode Current Density K amps/m$^2$ | Reduction Efficiency % |
|---|---|---|---|
| 30 | 4.8 | 1.0 | 90 |
| 50 | 4.2 | 1.0 | 94 |

In a second example an up-scale circular membrane cell was employed. This cell had electrodes each of 150 cm$^2$ surface area separated by a NAFION 117 membrane and the anode-cathode gap was 4 cm. The catholyte and anolyte had the same compositions as in the first example. The results are given in Table III.

TABLE III

| Electrode Materials | | Applied Potential volts | Electrolyte Flow l/hr | Reduction Efficiency % |
|---|---|---|---|---|
| Anode | Cathode | | | |
| Pb | Pb | 5 to 6.5 | 300 | 93 |
| Pt/Ti | Pb | 5 to 5.5 | 300 | 82 |
| Pt/Ti | Pt/Ti | 4.5 to 5 | 300 | 70 |

The influence of electrolyte circulation on uranyl conversion was then examined using the up-scale cell of the second example. The composition of the catholyte and anolyte were the same as before. The results obtained are given in Table IV.

TABLE IV

| Temperature °C. | Electrolyte Flow l/hr | Applied Potential volts | Electrode Current Density K amps/m$^2$ | Reduction Efficiency % |
|---|---|---|---|---|
| 50 | 120 | 5.5 to 7 | 2.0 | 94 |
| 50 | 275 | 5.0 to 6.5 | 2.0 | 93 |
| 50 | 400 | 4.5 to 5.5 | 2.0 | 90 |

In all the foregoing the term reduction efficiency (R.E.) is defined as $$R.E. = \frac{\text{Amount of } U^{4+} \text{ produced}}{\text{Theoretical quantity of } U^{4+}} \times 100\%$$

at 100% theoretical charge input for total U conversion.

Heating of the reduced solution of uranous fluorosulphate and the addition of hydrofluoric acid causes the precipitation of the cubic hydrate of uranium tetrafluoride (ideally $UF_4.0.75H_2O$ but of variable composition) which is washed to free it from sulphate and may then be dried in an oven and/or kiln. Conveniently the washing liquid is dilute hydrofluoric acid.

The temperature at which the hydrofluoric acid is added to precipitate the hydrated uranium tetrafluoride and at which the precipitate is washed is preferably above 90° C. although precipitation may be completed at lower temperatures with addition of greater excess of dilute hydrofluoric acid.

The solubility of $UF_4$ in $HF/H_2SO_4$ mixtures as measured by precipitation of $UF_4$ from 200 g/l U, 0.5M$H_2SO_4$, 0.75MHF solution at 90° C. is shown in Table V.

TABLE V

| % HF Stoichiometry | Residual U(IV) Solubility (g/l) | Precipitation Efficiency (%) |
|---|---|---|
| 50 | 200 | 0 |
| 75 | 70 | 65 |
| 100 | 5 | 97.5 |
| 125 | 1 | 99.5 |
| 150 | 0 | 100 |

We claim:

1. A process for the production of uranium tetrafluoride, including the step of electrolytically reducing a solution of uranyl fluoride-sulphate in aqueous sulphuric acid to uranous fluoride-sulphate complexes, said solution having a composition such that the uranium ions remain substantially in solution throughout said step of electrolytic reduction, and the subsequent step of adding hydrofluoric acid to precipitate hydrated uranium tetrafluoride from the uranous solution.

2. A process according to claim 1, which includes the step of dissolving one or more of the uranic oxides $UO_3$ and $U_3O_8$ in dilute sulphuric acid and adding hydrofluoric acid to prepare the uranyl fluoride-sulphate.

3. A process according to claim 2, wherein $U_3O_8$ is employed and an oxidant is also present in the dissolution step.

4. A process according to claim 3, wherein the oxidant is hydrogen peroxide.

5. A process according to claim 1, which includes the step of dissolving uranyl fluoride ($UO_2F_2$) in sulphuric acid to prepare the uranyl fluoride-sulphate.

6. A process according to claim 1, which includes the step of conditioning a uranyl sulphate solution which has been produced by a solvent extraction or ion exchange purification process, with hydrofluoric acid to prepare the uranyl fluoride-sulphate.

7. A process according to claim 1, wherein the electrolytic reduction is carried out at a temperature of about 50° C.

8. A process according to claim 1, wherein the addition of hydrofluoric acid to precipitate the hydrated uranium tetrafluoride is carried out at a temperature of at least 90° C.

9. A process according to claim 1, wherein said solution of uranyl fluoride-sulphate in aqueous sulphuric acid has a fluoride ion to uranium ion ratio less than 2 to 1.

10. A process according to claim 1, wherein said solution of uranyl fluoride-sulphate in aqueous sulphuric acid has a fluoride ion to uranium ion ratio in the range 0.50:1 to less than 2:1, and a sulphate ion to uranium ion ratio in the range 2.5:1 to greater than 1:1.

* * * * *